(12) United States Patent
Wu et al.

(10) Patent No.: US 12,103,056 B2
(45) Date of Patent: Oct. 1, 2024

(54) ORGANIC WASTE COLLECTION APPARATUS AND METHOD

(71) Applicant: Nanchang University, Nanchang (CN)

(72) Inventors: Daishe Wu, Nanchang (CN); Jianlong Li, Nanchang (CN); Xuechun Wu, Nanchang (CN); Yu Xu, Nanchang (CN)

(73) Assignee: Nanchang University, Nanchang (CN)

( * ) Notice: Subject to any disclaimer, the term of this patent is extended or adjusted under 35 U.S.C. 154(b) by 540 days.

(21) Appl. No.: 17/313,029

(22) Filed: May 6, 2021

(65) Prior Publication Data
US 2021/0346924 A1 Nov. 11, 2021

(30) Foreign Application Priority Data

May 7, 2020 (CN) .......................... 202010375448.7
Oct. 20, 2020 (CN) .......................... 202011123008.9

(51) Int. Cl.
*B09B 3/00* (2022.01)
*B01D 17/02* (2006.01)
(Continued)

(52) U.S. Cl.
CPC ............ *B09B 3/00* (2013.01); *B01D 17/0211* (2013.01); *B01D 17/0214* (2013.01);
(Continued)

(58) Field of Classification Search
CPC ....... B09B 3/00; B02C 18/0084; B02C 18/06; F26B 1/005; F26B 17/32; F26B 2200/04
See application file for complete search history.

(56) References Cited

U.S. PATENT DOCUMENTS

| | | | | |
|---|---|---|---|---|
| 3,971,310 | A | * | 7/1976 | Kondos ..................... B30B 9/24 210/351 |
| 5,125,500 | A | * | 6/1992 | Cailbault ............... B65G 47/61 198/470.1 |
| 5,484,247 | A | * | 1/1996 | Clark .................. B65B 69/0008 414/412 |

(Continued)

FOREIGN PATENT DOCUMENTS

| CN | 104016035 A | 9/2014 |
|---|---|---|
| CN | 109225427 A | 1/2019 |

(Continued)

OTHER PUBLICATIONS

CN-110756551-A Translation (Year: 2020).*
(Continued)

*Primary Examiner* — Magali P Slawski
*Assistant Examiner* — Marriah C G Ellington
(74) *Attorney, Agent, or Firm* — Bayramoglu Law Offices LLC (57) ABSTRACT

An organic waste collection apparatus includes a box, a conveying device, a separation device, a squeezing device, a heat shrink device and a recycling device arranged at an upper part of the box for separating a waste bag; a crushing device and a residue treatment device arranged at a lower part of the box for crushing and collecting organic waste; a central control device and a negative pressure purification device arranged in the middle of the box. In the resent disclosure, the waste bags are separated and collected separately, the waste is crushed and stored and transported in the form of residue, or the residue is further performed dry-wet separation, oil-water separation to collect oil, which can realize the safe and efficient treatment of organic waste.

19 Claims, 3 Drawing Sheets

(51) Int. Cl.
  B01D 17/12   (2006.01)
  C02F 1/00    (2023.01)
  C02F 1/40    (2023.01)
  C02F 9/00    (2023.01)
  C02F 11/123  (2019.01)
  C02F 101/32  (2006.01)

(52) U.S. Cl.
  CPC .............. *B01D 17/12* (2013.01); *C02F 1/008* (2013.01); *C02F 9/00* (2013.01); *C02F 1/004* (2013.01); *C02F 1/40* (2013.01); *C02F 11/123* (2013.01); *C02F 2101/32* (2013.01)

(56) References Cited

U.S. PATENT DOCUMENTS

| | | | | |
|---|---|---|---|---|
| 5,577,787 A | * | 11/1996 | Klope | B66C 1/36 24/600.1 |
| 8,618,432 B2 | * | 12/2013 | Miller | B03C 7/08 209/127.2 |
| 2011/0186405 A1 | * | 8/2011 | Blanc | B65G 47/61 198/867.02 |

FOREIGN PATENT DOCUMENTS

| | | | | |
|---|---|---|---|---|
| CN | 105246598 B | | 9/2019 | |
| CN | 110355186 A | | 10/2019 | |
| CN | 110756551 A | * | 2/2020 | |
| CN | 111453246 A | | 7/2020 | |
| CN | 111498946 A | | 8/2020 | |
| CN | 111573085 A | | 8/2020 | |
| CN | 112337957 A | * | 2/2021 | |
| EP | 1029595 A1 | | 8/2000 | |
| FR | 2931089 A1 | * | 11/2009 | ............... B09B 3/00 |
| IN | 210280158 U | | 4/2020 | |
| JP | 2003245506 A | | 9/2003 | |
| JP | 2013504503 A | * | 2/2013 | ............... B65F 1/002 |

OTHER PUBLICATIONS

JP-2013504503-A Translation (Year: 2013).*
FR-2931089-A1 Translation (Year: 2009).*
CN-112337957-A Translation (Year: 2021).*
CN112337957-Desc-en.*

* cited by examiner

FIG. 5

ORGANIC WASTE COLLECTION APPARATUS AND METHOD

CROSS REFERENCE TO THE RELATED APPLICATIONS

This application is based upon and claims the priority of the Chinese patent application filed on May 7, 2020, with the application number of CN202010375448.7 and the Chinese patent application filed on Oct. 20, 2020, with the application number of CN202011123008.9, the entire contents of which are incorporated herein by reference.

TECHNICAL FIELD

The present disclosure relates to the field of waste collection and treatment, and more particularly to an organic waste collection apparatus and method.

BACKGROUND

The descriptions here only provide background information pertaining to the disclosures of the present disclosure, and do not necessarily constitute a prior art.

Organic waste have the feature of high moisture content, generally 70%-80%. Compared with dry waste, organic waste are more difficult to collect, transport and treat, have the problems of evaporating, emitting, dripping, leaking, odor dissipation and the like especially during collection and transportation, and have the risks of causing environmental pollution and spreading epidemic diseases. A waste collection apparatus is an indispensable facility to centrally treat waste, improve living environment of people, and inhibit the spread of pathogenic bacteria; especially under the influence of the outbreak of COVID-19, people gradually realize that conventional waste collection apparatuses may be a bacteria spread way by means of odor leakage, waste liquid outflow, manual packing and bag change.

SUMMARY

One or more embodiments of the present disclosure provide an organic waste collection apparatus which has the functions of separating a waste bag and crushing, pulping and collecting organic waste.

In some embodiments, the organic waste collection apparatus includes a box and the following components installed in the box:

a conveying device, a separation device, a squeezing device, a heat shrink device and a recycling device that are located at an upper part of the box and used for separating a waste bag;

a crushing device and a residue treatment device that are located at a lower part of the box and used for crushing and collecting organic waste; and a central control device and a negative pressure purification device that are installed in the box;

the conveying device is disposed on an inlet side of the box; the separation device is disposed below the conveying device; the separation device and the heat shrink device are respectively disposed on two sides of the squeezing device; the recycling device is disposed on an outlet side of the box; and the crushing device is located below the separation device and above the residue treatment device.

In some embodiments, the conveying device includes a horizontal track and a moving base capable of reciprocating on the horizontal track, wherein a bag rolling motor is installed on the moving base; a primary rod for hanging waste bags is fixedly installed on a rotating shaft of the bag rolling motor; a heavy hammer and an auxiliary rod are fixed on the primary rod; the auxiliary rod is fixed on a side adjacent to the squeezing device, and includes a fixed section and a bending section; a bending spring is disposed between the fixed section and the bending section; the bending section is in parallel with the primary rod; the conveying device is fixedly provided with a baffle plate on a side adjacent to the squeezing device; when the primary rod moves to the leftmost end of the horizontal track, the bending section of the auxiliary rod bends under the blocking of the baffle plate.

In some embodiments, the separation device is a first cutter which is disposed below the conveying device; when a waste bag containing waste is conveyed to the first cutter, the lower part of the waste bag comes into contact with the first cutter and is cut by the first cutter, and the waste inside the waste bag fall into the crushing device.

In some embodiments, the squeezing device is squeezing rollers that are pairwise configured, elastically press each other, and have smooth surfaces; piercing rollers that are pairwise configured, elastically press each other, and have spikes are disposed at a front end of the squeezing device; when the separated waste bag is conveyed to the squeezing device, the waste bag is driven by the primary rod to pass through the piercing rollers and squeezing rollers; and a spray device is further disposed above the squeezing device. In other embodiments of the present disclosure, the waste bag piercing manner is not limited to the use of the piercing roller.

In some embodiments, the heat shrink device is a first heater which is disposed at a rear end of the squeezing device; when the waste bag is conveyed to the heat shrink device after water is squeezed out, the first heater and the bag rolling motor simultaneously operate, enabling the waste bag to shrink and roll on the primary rod and the auxiliary rod; a rotating push rod for stripping the waste bag rolled on the primary rod and the auxiliary rod is disposed at the rightmost end of the horizontal track; the rotating push rod is disposed above the recycling device; and the recycling device is a first bag box.

In some other embodiments of the present disclosure, the conveying device is a conveyor belt; the separation device is disposed at an end of the conveyor belt, and is a second cutter; when the waste bag containing waste is conveyed to the second cutter, a side end of the waste bag comes into contact with the second cutter and is cut by the second cutter, and the waste inside the waste bag fall into the crushing device.

In at least one embodiment of the present disclosure, the squeezing device includes two sets of squeezing belt groups, wherein the squeezing belt group includes two belts that rotate from outside to inside and elastically press each other; the belts are vertically disposed; and the second cutter is disposed between the two sets of squeezing belt groups.

In at least one embodiment of the present disclosure, a suction bucket is disposed at the rear end of the squeezing device; a feed opening is disposed below the suction bucket; the heat shrink device is a second heater which is installed on a side wall of the feed opening; the recycling device is a second bag box; and a suction pump is disposed above the second bag box.

In some embodiments of the present disclosure, the crushing device includes crushing rollers which are pairwise configured, a support plate for supporting the crushing rollers, and an elastic mechanism, the gear teeth of the crushing rollers alternately fit with each other. In other embodiments, the crushing device can be a crusher having a crushing function.

In some embodiments, the residue treatment device includes a residue bucket and a rotating cover disposed at an upper end of the residue bucket; the residue treatment device is further provided with a transportation device, wherein the transportation device is in communication with the residue bucket via a suction pipe, and is provided with a liquid pump.

In some other embodiments, the residue treatment device includes a filtration device and an oil-water separation device, wherein the filtration device includes a filter screen oblique plate and a water receiving and flow guiding plate; the filter screen oblique plate is connected to a vibrator, and is provided with soft baffle plates on two sides; the soft baffle plates are in close contact with inner walls of the waste collection apparatus; the water receiving and flow guiding plate is installed below the filter screen oblique plate;

the oil-water separation device includes a liquid collection tank, an oil drain pipe, and a first water drain pipe; and the water receiving and flow guiding plate is in communication with the liquid collection tank.

In some embodiments, the oil drain pipe and the first water drain pipe are disposed on one side of the liquid collection tank, and the oil drain pipe is higher than the first water drain pipe; a first water drain valve is disposed on the first water drain pipe; a suspension with the density in the range of 0.92-0.98 g/cm$^3$ is disposed in the liquid collection tank; and the suspension is linked with the first water drain valve via a linkage rod.

In some embodiments, a bag layer is installed below a discharge end of the filter screen oblique plate; the bag layer is connected to a waste bag roll; and a tying device is disposed below the bag layer.

In some embodiments, a telescopic rod is disposed on the linkage rod, and is used for setting/adjusting a water drain level of the first water drain pipe of the liquid collection tank.

In some embodiments, a second water drain pipe is disposed at the bottom of the liquid collection tank; a second water drain valve is disposed on the second water drain pipe; the first water drain valve and the second water drain valve are connected to the central control device.

In some embodiments, a sensor is disposed on the crushing device; the sensor is connected to the central control device; after the crushing is completed, the sensor transmits a start signal to the central control device.

In some embodiments, a spray device is respectively disposed above the crushing rollers and the filter screen oblique plate; the spray device includes spray heads, the spray heads are in communication with a water inlet pipe; a water inlet valve is disposed on the water inlet pipe, and is connected to the central control device.

In some embodiments, the central control device starts timing after receiving the start signal, and opens the water inlet valve after a 0.5-5 min delay; and the central control device controls the water inlet valve to open for at least 1-10 min.

In some embodiments, a monitoring camera is disposed above the linkage rod; the monitoring camera is disposed at a position that an upper end of the linkage rod can touch when the suspension and the oil drain pipe are at the same height; and the monitoring camera is connected to the central control device.

In some embodiments, after the water inlet valve is opened, the central control device controls the first water drain valve to close; if the central control device does not receive a signal indicating that the monitoring camera is touched by the linkage rod, the water inlet valve remains open; if a controller receives the signal indicating that the monitoring camera is touched by the linkage rod, the water inlet valve is closed, and the second water drain valve is opened; and after the water inlet valve is closed, the second water drain valve is closed after a 5-30 s delay.

BRIEF DESCRIPTION OF THE DRAWINGS

The present disclosure will be further described below with reference to the accompanying drawings and specific embodiments.

In the drawings.

A, first waste bag separation mechanism; B, second waste bag separation mechanism; 01, box; 02, conveying device; 03, separation device; 04, squeezing device; 05, heat shrink device; 06, recycling device; 07, crushing device; 08, residue treatment device; 09, transportation device; 1, moving base; 2, bag rolling motor; 3, primary rod; 4, heavy hammer; 5, waste bag; 6, bending spring; 7, auxiliary rod; 71, fixed section; 72, bending section; 8, baffle plate; 9, horizontal track; 10, piercing roller; 11, spray device (spray head); 12, squeezing roller; 13, first heater; 14, rotating push rod; 15, first bag box; 16, box cover; 17, first cutter; 18, crushing roller; 19, rotating cover; 20, residue bucket; 21, bag taking opening; 22, central control device (central controller); 23, negative pressure purification device; 231, negative pressure pump; 232, ultraviolet sterilization chamber; 233, adsorption and treatment chamber; 24, liquid pump; 25, conveyor belt; 26, second cutter; 27, bag drawer; 28, suction bucket; 29, second heater; 30, second bag box; 31, suction pump; 32, squeezing belt group; 321, belt; 33, feed opening; 34, suction pipe; 35, elastic mechanism (spring); 36, support plate; 307, filtration device; 308, oil-water separation device; 37, filter screen oblique plate; 38, water receiving and flow guiding plate; 39, vibrator; 40, liquid collection tank; 41, first water drain pipe; 42, first water drain valve; 43, oil drain pipe; 44, suspension; 45, linkage rod; 46, bag layer; 47, waste bag roll; 48, tying device; 49, telescopic rod; 50, second water drain pipe; 51, second water drain valve; 52, sensor; 53, water inlet pipe; 54, water inlet valve; 55, monitoring camera; and 56, waste bag outlet.

DETAILED DESCRIPTION OF THE EMBODIMENTS

The invention application No. CN111573085A discloses a mobile garbage compression device for collecting organic waste, including a compression bin and a garbage box, wherein a discharge port for discharging garbage, and a discharge door covering the discharge port are disposed at one end of the garbage box distal from the compression bin; a feed port for feeding garbage is vertically disposed at an upper part of one end of the compression bin distal from the garbage box; the compression bin includes a squeezing layer and a sewage layer; the squeezing layer is located at the upper layer, and is used for accommodating the fed garbage and squeezing the garbage; the sewage layer is located at the lower layer, and is used for filtering the sewage in the garbage; the squeezing layer and the sewage layer are separated by a filtration layer; a squeezing mechanism for squeezing the garbage entering the squeezing layer is disposed at an upper part of the compression bin; a garbage can overturn mechanism is disposed outside a wall on the feed port side; the garbage can overturn mechanism is used for hanging a garbage can, lifting and turning over the garbage can to the feed port position to dump the garbage. The application reduces the stink degree of odor emitted by rotten garbage, and does not need to adopt a fully enclosed transportation means.

The invention application No. CN111498946A discloses a negative pressure collection and treatment system for organic waste, and relates to the technical field of organic waste treatment; the system includes a negative pressure oil separation box, wherein the negative pressure oil separation box is internally divided into a sewage collection area and an oil separation area; the tops of the sewage collection area and the oil separation area are connected; the sewage collection area is connected to an organic waste disposal system; the sewage collection area is further connected to a screw type dewatering system which is connected to the oil separation area; the oil separation area is connected to a negative pressure oil separation system; the negative pressure oil separation box and the negative pressure oil separation system are both provided with a negative pressure forming assembly; and the negative pressure oil separation box, the organic waste disposal system, the screw type dewatering system, and the negative pressure oil separation system are all connected to a control system. However, the apparatuses provided by the above invention have high energy consumption, and are complex to treat garbage.

The invention application No. 202010136088.5 discloses a waste collection apparatus for preventing the breeding and spreading of bacteria in organic waste; the system can crush and filter garbage, realizes solid-liquid separation, can automatically change a waste bag, and effectively solves the problems of bacteria breeding and human infection during garbage transportation.

The invention patent No. CN105246598B discloses a garbage and oil and water separator; the equipment utilizes different resistance values of oil and water to control the open and close of an oil-water separation valve, so as to realize oil-water separation; the invention provides a garbage treatment apparatus having the oil-water separation function. However, in view of the large difference in waste constituents, the oil-water identification and separation based on the resistance method are complex, and cannot efficiently separate oil.

As far as the inventor knows, at present, the organic waste collection apparatuses in the market generally have the problems of deficient functions, lack of overall control for water, gas and residue; furthermore, the blockage problem caused by the solidification of oil in the organic waste collection apparatus also bothers relevant person skilled in the art all the time.

In view of the above technical problems, the present disclosure provides an organic waste collection apparatus and method.

The technical solutions in the embodiments of the present disclosure will be clearly and completely described hereafter in combination with the drawings in the embodiments of the present disclosure. It is apparent that the described embodiments are only a part of the embodiments of the present disclosure, but not the whole. Based on the embodiments of the present disclosure, all the other embodiments obtained by those skilled in the art without inventive effort are within the scope of the present disclosure.

In the descriptions of the present disclosure, it should be understood that the azimuth or position relationships indicated by the terms "upper", "lower", "inside" "outside", "left", "right" and the like are the azimuth or position relationships as shown in the drawings, and are only intended to facilitate the description of the present disclosure and simplify the description, but not to indicate or imply that the designated devices or elements must have a specific azimuth or are constructed and operated in a specific azimuth. Therefore, the terms cannot be considered to limit the present disclosure.

In the present disclosure, unless otherwise specified and stated, the terms "dispose", "install", "connect", "fix" and the like should be understood in a broad sense, for example, the term "connection" can be a fixed connection, a detachable connection, a mechanical connection, or a direct connection. A person skilled in the art can understand the specific meanings of the above terms in the present disclosure according to specific circumstances. In the case of no conflicts, the embodiments of the present disclosure and the features in the embodiments can be mutually combined.

Embodiment 1

Figure 1:
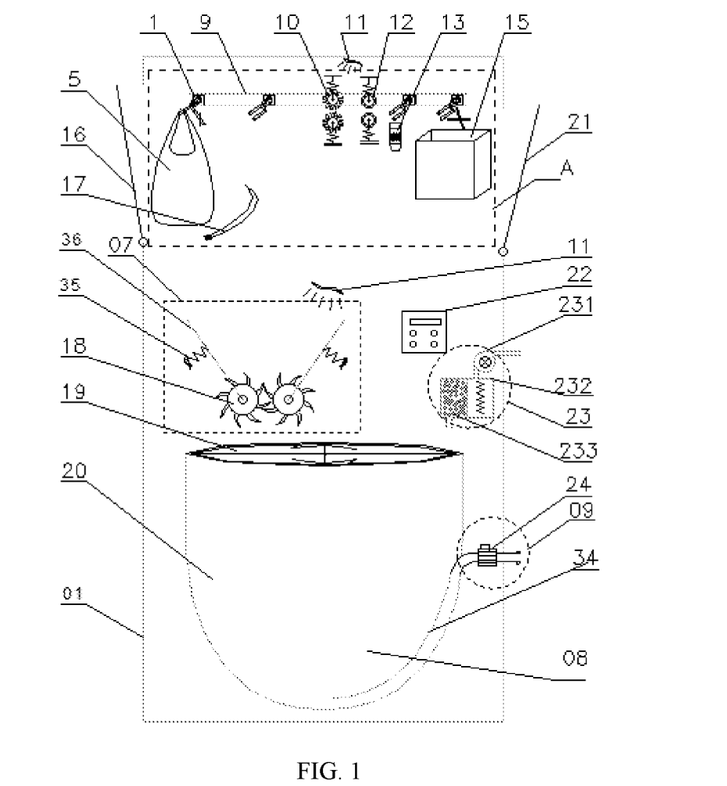
FIG. 1 is a structural schematic view of an organic waste collection apparatus according to the embodiment 1.
Figure 2:
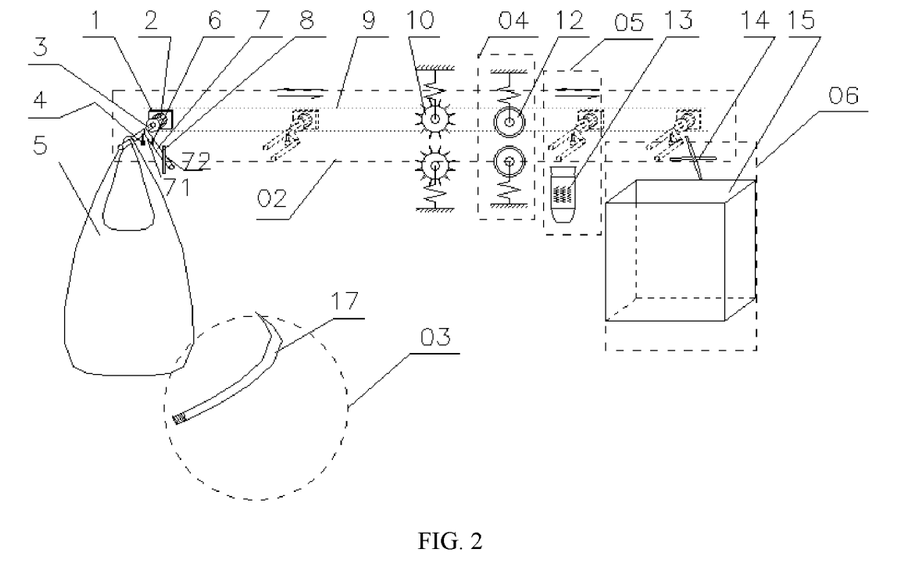
FIG. 2 is a structural schematic view of the part A (first waste bag separation mechanism) in FIG. 1.

With reference to FIG. 1-2, the present embodiment provides an organic waste collection apparatus which integrates crushing, pulping and collecting, has the function of separating a waste bag, and includes a box 01 and the following components installed in the box 01:

a conveying device 02, a separation device 03, a squeezing device 04, a heat shrink device 05 and a recycling device 06 that are located at an upper part of the box 01 and used for separating a waste bag 5 (as shown in the figure, a first waste bag separation mechanism A is used for separating a waste bag);

a crushing device 07 and a residue treatment device 08 that are located at a lower part of the box 01 and used for crushing and collecting organic waste; and a central control device 22 and a negative pressure purification device 23 that are installed in the middle of the box 01;

an inlet side and an outlet side, which correspond to a left upper side and a right upper side in the figure, are disposed at an upper part of the box 01, the inlet side is provided with a box cover 16, and the outlet side is provided with a bag taking opening 21;

the conveying device 02 is disposed on the inlet side of the box 01, and extends to the outlet side.

In at least one embodiment, the conveying device 02 includes a horizontal track 9 and a moving base 1 capable of smoothly reciprocating on the horizontal track 9, the moving base 1 and the horizontal track 9 generally adopt gear transmission or belt transmission; a bag rolling motor 2 is installed on the moving base 1; a primary rod 3 for hanging waste bag 5 is fixedly installed at a front end of a rotating shaft of the bag rolling motor 2; a heavy hammer 4 and an auxiliary rod 7 are fixed at an intermediate section of the primary rod 3 with a certain angle therebetween; the auxiliary rod 7 has an L shape; an angle relationship between the heavy hammer 4 and the auxiliary rod 7 is: when the heavy hammer 4 remains vertically downward under the action of gravity, the auxiliary rod 7 gets close to one side of the squeezing device 04, and a plane formed by the auxiliary rod 7 and the primary rod 3 is in parallel with the horizontal track 9.

In some embodiments, the auxiliary rod 7 includes a fixed section 71 and a bending section 72, wherein the fixed section 71 is fixed perpendicular to the primary rod 3; the bending section 72 is in parallel with the primary rod 3; a front end of the bending section 72 extends forward and exceeds a front end of the primary rod 3; a bending spring 6 is disposed between the fixed section 71 and the bending section 72, providing a deformation capability and a recovery elasticity for the auxiliary rod 7; in at least one embodiment, the bending spring 6 is disposed on the fixed section 71; furthermore, a baffle plate 8 is fixed at an appropriate position at a left end of the horizontal track 9 on one side adjacent to the squeezing device 04; and the baffle plate 8 is located at a position that the front end of the bending section of the auxiliary rod 7 can reach when extending out while the front end of the primary rod 3 can not reach. When the primary rod 3 moves to the left end of the horizontal track 9, the bending section 72 of the auxiliary rod 7 is blocked by the baffle plate 8; when the primary rod 3 continues to move leftward, the bending spring 6 is stretched, and the front end of the bending section 72 is blocked and starts to bend to the squeezing device 04 side, until the primary rod 3 moves to the leftmost end; and when the primary rod 3 moves rightward, the auxiliary rod 7 restores to an original state, which separates the primary rod 3 from the auxiliary rod 7, and ensures that a garbage disposal person would not hang the waste bag 5 at the position of the auxiliary rod 7 by mistake, so as to avoid influencing subsequent bag rolling operation.

The separation device 03 is disposed on a lower side of the conveying device 02. In other embodiments of the present disclosure, the separation device 03 is disposed on a mid-lower side of the conveying device 02.

In at least one embodiment, the separation device 03 is a first cutter 17 which is disposed below the conveying device 02; when a waste bag 5 containing organic waste is hung on the primary rod 3, and is conveyed to the first cutter 17 together with the moving base 1, the lower part of the waste bag 5 comes into contact with the transversely set first cutter 17 and is cut by the first cutter 17, and the organic waste inside the waste bag are all released and fall into the crushing device 07 below. The first cutter 17 is fixed at an appropriate position on a front/rear inner wall of the box 01.

The squeezing device 04 is disposed on the right side of the separation device 03.

In at least one embodiment, the squeezing device 04 is squeezing rollers 12 consisting of rollers that are pairwise configured, elastically press each other, and have smooth surfaces; in other embodiments of the present disclosure, rolling shafts are used; a piercer is disposed at a front end of the squeezing device 04 (the left side in the figure); the piercer is rollers that are pairwise configured, elastically press each other, and have spikes, namely piercing rollers 10; and a gap is disposed between the rollers thereof, such that the primary rod 3 can drag the waste bag 5 to pass through. When the cut and separated waste bag 5 is conveyed to the gap, the heavy hammer 4 is vertical under gravity, and the plane formed by the auxiliary rod 7 and the primary rod 3 is in parallel with the horizontal track 9, thereby ensuring that the auxiliary rod 7 and the primary rod 3 can pass through the roller gap between the piercing rollers 10 and the squeezing rollers 12 in the moving process.

When the primary rod 3 drives the waste bag 5 to pass through the piercing rollers 10, the waste bag 5 is pierced with small holes under the action of the spikes on the piercing roller 10, thereby facilitating the extrusion of residue in the waste bag 5; and when the primary rod 3 drives the waste bag 5 to pass through the squeezing device 04, the residue in the waste bag 5 is extruded out under the squeezing of the squeezing roller 12.

In some embodiments, a spray device 11, namely a spray head 11, is disposed above the piercing roller 10, the squeezing device 04 and the crushing device 07 respectively; the piercing roller 10, the squeezing device 04, and the crushing device 07 are sprayed and cleaned by the spray heads 11, so as to remain the components clean; and the crushed waste and the cleaning solution both enter the residue treatment device 08.

The heat shrink device 05 is disposed on the right side of the squeezing device 04.

In at least one embodiment, the heat shrink device 05 is a first heater 13, which is disposed at a rear end of the squeezing device 04 (the right side in the figure). When the waste bag 5 after squeezing water out is conveyed to the heat shrink device 05 under the drag of the primary rod 3, the first heater 13 and the bag rolling motor 2 simultaneously operate; the first heater 13 (an electric heater is used in some embodiments) enables the waste bag 5 to shrink and bond into a lump; and the bag rolling motor 2 controls the primary rod 3 to rotate, and rolls the adhesive waste bag 5 on the primary rod 3 and the auxiliary rod 7.

In at least one embodiment, a rotating push rod 14 for stripping the waste bag 5 rolled on the primary rod 3 and the auxiliary rod 7 is disposed at the rightmost end of the horizontal track 9; the rotating push rod 14 is disposed above the recycling device 06. The drive power of the rotating push rod 14 is supplied by a motor. When the rotating push rod 14 operates, the bag rolling motor 2 is in a non-operating state; in the rotation process of the rotating push rod 14, the waste bag 5 rolled on the primary rod 3 and the auxiliary rod 7 is stripped and falls into the recycling device 06 below.

The recycling device 06 is a first bag box 15, and is disposed at the bag taking opening 21 on the outlet side of the box 01.

The crushing device 07 is disposed below the separation device 03, and is located above the residue treatment device 08.

In at least one embodiment, the crushing device 07 includes crushing rollers 18 which are pairwise configured, a support plate 36 for supporting the crushing rollers 18, and an elastic mechanism 35, the support plate 36 is fixed at an appropriate position on an inner wall of the box 01. The residue treatment device 08 includes a residue bucket 20 and a rotating cover 19 disposed at an upper end of the residue bucket 20, the drive power of the rotating cover 19 can be supplied by a motor. When any one of the squeezing device 04, the spray device 11, and the crushing device 07 operates, the rotating cover 19 is in an open state; and when the above devices are all in a non-operating state, the rotating cover 19 is in a closed state.

In at least one embodiment, the moving base 1, the bag rolling motor 2, the first heater 13, the rotating push rod 14, the spray device 11, and the rotating cover 19 are all associated with the central control device (the central controller 22). The waste disposal personnel suspends the waste bag 5 containing waste to the primary rod 3, the central controller 22 controls the moving base 1 to move on the horizontal rail 9, so as to drive the waste bag 5 to move, when the waste bag 5 moves to the first cutter 17, all the waste inside are released and fall into the crushing device 07 below; the central controller 22 controls the action of the crushing device 07, while the waste bag 5 continues to move; when the waste bag 5 is pierced and squeezed during passing through the piercing rollers 10 and the squeezing rollers 12; when the waste bag 5 moves to the first heater 13, the central controller 22 controls the first heater 13 to start and the bag rolling motor 2 to act, which enables the waste bag 5 to shrink and bond into a lump on the primary rod 3 and the auxiliary rod 7, the residence time here is flexibly set according to the actual situation; the adhesive waste bag 5 continues to move to the recycling device 06, at this time, the central controller 22 controls the rotating push rod 14 through the motor to strip the waste bag 5 on the primary rod 3 and the auxiliary rod 7; the central controller 22 also controls the action of the spray device 11, the start time node and the action period can be adjusted according to actual needs.

When the rotating cover 19 is in the open state, the central controller 22 controls the negative pressure purification device 23 to start, so as to maintain a negative pressure in the waste collection apparatus such that no peculiar smell in the apparatus is emitted, and ensure that a sucked air is already sterilized and has no peculiar smell. The negative pressure purification device 23 includes a negative pressure pump 231, an ultraviolet sterilization chamber 232 and an adsorption and treatment chamber 233 which are sequentially connected to an inlet of the negative pressure pump 231, wherein an outlet of the negative pressure pump 231 is in communication with the ambient.

In other embodiments of the present disclosure, the control action and control time of the central controller 22 can be flexibly set.

In at least one embodiment, when the box cover 16 and the bag taking opening 21 are opened, the central controller 22 controls the negative pressure purification device 23 to start.

In further embodiments, the collection apparatus further includes a transportation device 09, which is in communication with the residue treatment device 08. The transportation device 09 is in communication with the residue bucket 20 via a suction pipe 34, and further includes a liquid pump 24. The liquid pump 24 pumps out and transports residue liquid in the residue bucket 20; in some embodiments, the liquid pumping operation is completed by an external device.

The collection apparatus provided by the present disclosure separates and collects the waste bag by means of bag crushing, seperating, water extruding and heat shrink; since the waste bag is easy to wind and difficult to treat during crushing; furthermore, the plastic waste bag affects the subsequent treatment of the organic waste; in order to crush the organic waste and store and transport the organic waste in a residue pulp form, the waste bag needs to be separately collected; the present disclosure provides a simple bag crushing manner, a reliable water extruding manner, and a stable heat shrink manner, which realizes efficient waste bag separation; furthermore, in view of the feature of high moisture content of the organic waste, the waste is crushed and stored and transported in the residue pulp form, thereby facilitating transportation by means of pumping, and avoiding the problems of evaporating, emitting, dripping, and leaking during collection and transportation; people does not directly contact the waste, thereby reducing the risks of causing environmental pollution and spreading epidemic diseases. The collection apparatus provided by the present embodiment also has a good collection effect for kitchen garbage which have a high moisture content and need to be crushed and pulped.

Embodiment 2

The difference of the present embodiment over the embodiment 1 is: the present embodiment adopts a second waste bag separation mechanism B.

Figure 3:
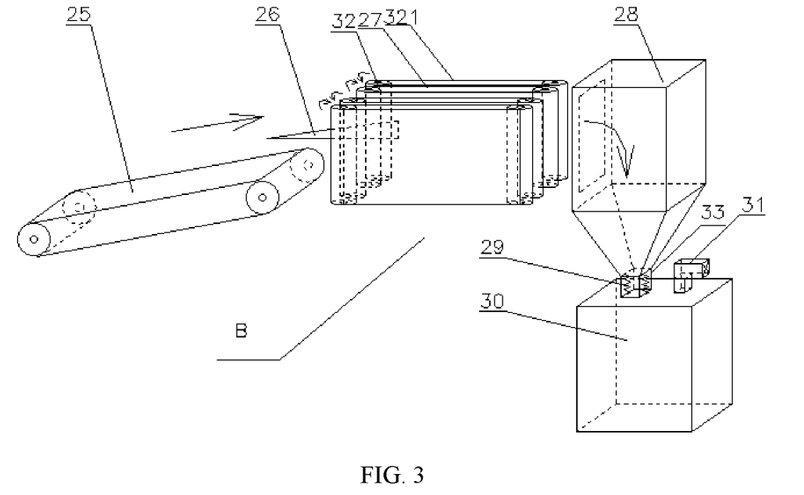
FIG. 3 is a schematic view of a second waste bag separation mechanism of the organic waste collection apparatus according to the embodiment 2.

With reference to FIG.3, the conveying device is disposed on the inlet side of the box 01. The conveying device is a conveyor belt 25, which is configured to form an upward slope from left to right.

A left end of the conveyor belt 25 is adjacent to the box cover 16 of the waste collection apparatus, and the squeezing device is disposed at a right end of the conveyor belt 25 with a certain interval. The squeezing device is a bag drawer 27. The interval should not be too long, so as to prevent the waste bag 5 from falling with the waste because the waste bag cannot be drawn away by the bag drawer 27.

The separation device which is a second cutter 26 is disposed between the conveyor belt 25 and the bag drawer 27.

When a waste bag 5 containing waste is conveyed to the second cutter 26, one side of the waste bag 5 comes into contact with the second cutter 26, and is punctured and cut into two parts; the waste inside the waste bag 5 fall into the crushing device; and the cut waste bag 5 is incidentally drawn away by the bag drawer 27.

The bag drawer 27 includes two sets of squeezing belt groups 32, which includes two belts 321 that rotate from outside to inside (namely rotate to inside in opposite directions) and elastically press each other; that is, an elastic structure, for example a spring, is disposed between a face and a back of the belt; the belts are vertically disposed; the second cutter 26 is fixed between the two sets of squeezing belt groups 32; and the drive power of the belts 321 is supplied by the motor.

A suction bucket 28 is disposed at a rear end of the bag drawer 27 (the right side in the figure); a feed opening 33 is disposed below the suction bucket 28; the heat shrink device is a second heater 29 which is installed on a side wall of the feed opening 33; the recycling device is a second bag box 30; and a suction pump 31 is disposed above the second bag box 30, which is used to provide a negative pressure.

Under the squeezing and conveying of the bag drawer 27 and the suction of the negative pressure in the suction bucket 28, the waste bag 5 enters the suction bucket 28, shrinks by heat and bonds into a lump when passing through the second heater 29, and finally falls into the second bag box 30 below.

The conveyor belt 25 and the second heater 29 are both connected to the central controller 22.

In some embodiments, the conveyor belt 25 is provided with a gravity sensing apparatus; when the waste bag 5 is placed on the conveyor belt 25, the gravity sensing apparatus triggers a sensing signal, and the central controller 22 controls the conveyor belt 25 to act.

In addition to the waste bag separation mechanism B which is different from the embodiment 1, the other structures of the present embodiment and the implementation means can refer to the embodiment 1.

Embodiment 3

The present disclosure further provides an organic waste collection method.

The method can be applied to the collection apparatus of the embodiment 1 or the embodiment 2, and includes the following steps:

the waste bag 5 containing waste is hung or placed on the conveying device 02 via the box cover 16, and is conveyed to the separation device 03 by the conveying device 02;

when the waste bag 5 is conveyed to the separation device 03, the waste bag 5 comes into contact with the cutter and is cut by the cutter; the waste therein are released and fall into the crushing device 07; and the waste bag 5 enters the squeezing device 04, so as to separate the waste from the waste bag 5;

the crushing device 07 crushes and pulps the waste; the treated waste fall into the residue bucket 20 of the residue treatment device 08, and are then transported by the transportation device 09;

the squeezing device 04 squeezes out the water in the waste bag 5; the treated waste bag 5 shrinks by heat and bonds into a lump via the heat shrink device 05, is then collected in the recycling device 06, and finally taken out from the bag taking opening 21;

the spray heads 11 spray water to clean the squeezing device 04 and the crushing device 07, so as to remain the components clean; the crushed waste and the cleaning solution both enter the residue treatment device 08;

the operations of the conveying device 02, the heat shrink device 05, the residue treatment device 08 are all controlled by the central control device. Specifically, the central controller 22 controls the actions of the conveying device 02, the startup and shutdown of he heat shrink device 05, the open and close of he rotating cover 19, the actions of the liquid pump 24 and the like.

further, in the step 3 and step 4, the rotating cover 19 is in the open state; and in the steps 1 and 2, the rotating cover 19 is in the closed state. When the rotating cover 19 is in the open state, the central controller controls the negative pressure purification device 23 to start, so as to maintain a negative pressure in the waste collection apparatus such that no peculiar smell in the apparatus is emitted, and ensure that a sucked air via the negative pressure purification device 23 is already sterilized and has no peculiar smell.

When the box cover 16 and the bag taking opening 21 are opened, the central controller 22 controls the negative pressure purification device 23 to start.

Embodiment 4

Figure 4:
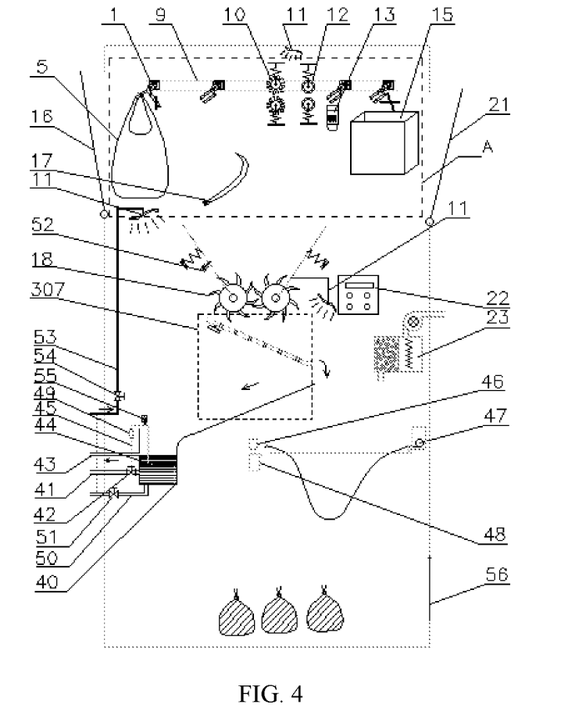
FIG. 4 is a structural schematic view of an organic waste collection apparatus according to the embodiment 4 and the embodiment 5.

The present disclosure further provides an organic waste collection apparatus which has the functions of waste bag separation, organic waste crushing, dry-wet separation, oil-water separation, and oil collection. With reference to FIG. 4, the waste collection apparatus adopts the first waste bag separation mechanism A, the separation device 03 and the crushing device 07 in the embodiment 1, wherein the crushing device 07 includes crushing rollers 18 (which are at least a pair), a support plate 36 for supporting the crushing rollers 18, and a spring 35 for tensioning the crushing rollers 18; the residue treatment device 08 is disposed below the crushing device 07, and includes a filtration device 307 and an oil-water separation device 308, the filtration device 307 includes a filter screen oblique plate 37 disposed below the crushing rollers 18 and a water receiving and flow guiding plate 38; the filter screen oblique plate 37 is slantwise disposed, and the upper end thereof is connected to a vibrator 39; the filter screen oblique plate 37 is provided with soft baffle plates on left and right sides; the soft baffle plates are in close contact with inner walls of the waste collection apparatus, and can prevent the waste from falling; a discharge end of the filter screen oblique plate 37 warps up to form a liquid collection trench; the liquid collection trench blocks the liquid, and prevents the liquid having not passed through the filter screen from flowing into the waste bag; the water receiving and flow guiding plate 38 is disposed below the filter screen oblique plate 37, and is in communication with a liquid collection tank 40 of the oil-water separation device 308; the oil-water separation device 308 includes the liquid collection tank 40, an oil drain pipe 43, and a first water drain pipe 41; the oil drain pipe 43 and the first water drain pipe 41 are disposed on one side of the liquid collection tank 40; the oil drain pipe 43 is higher than the first water drain pipe 41; a first water drain valve 42 is disposed on the first water drain pipe 41; a suspension 44 with the density 0.92-0.98 g/cm³ is disposed in the liquid collection tank 40; the suspension 44 is linked with the first water drain valve 42 via a linkage rod 45; and a telescopic rod 49 is disposed on the linkage rod 45, and is used for setting/adjusting a water drain level of the first water drain pipe 41 of the liquid collection tank 40;

a bag layer 46 is installed below a discharge end of the filter screen oblique plate 37; the bag layer 46 is connected to a waste bag roll 47; and a tying device 48 is disposed below the bag layer 46;

a negative pressure purification device 23 which is the same as that in the embodiment 1 is also disposed in the waste collection apparatus.

The operating principle of the waste collection apparatus of the present embodiment is:

The waste in the waste bag cut by the separation device 03 and the residual water extruded by the squeezing device 04 fall to the crushing rollers 18; under the cutting and squeezing of the crushing rollers 18, the solids are crushed, and the liquid is extruded out; the crushed waste and the liquid are discharged from the lower sides of the crushing rollers 18, and fall on the filter screen oblique plate 37; owing to the tensioning spring 35 disposed on the crushing rollers 18, the waste are crushed to the most extent, and the difficult-to-crush objects are allowed to pass, thereby preventing the apparatus from failing due to blockage and avoiding damaging the crushing rollers.

The waste falling on the filter screen oblique plate 37 slide downward along the slope under the vibration of the vibrator 39 and the action of the gravity, and fall into the waste bag laid by the bag layer 46 from the discharge end; the bag layer 46 and the tying device 48 packs and ties the waste (dry waste or semi-dry waste), then draws a new waste bag from the waste bag roll 47, and lays the waste bag again. The packed waste bag can be taken out from a waste bag outlet 56, so as to realize wet and dry waste separation; after the waste are pressed and crushed, the water is mostly extruded out, and the volume of the waste becomes small, such that the waste collected in the waste bag has a reduced water content and an improved stacking density, and occupy less space; therefore, the subsequent storage, transportation and treatment costs are all reduced. The liquid falling on the filter screen oblique plate 37 drips to the water receiving and flow guiding plate 38 through screen meshes of the filter screen oblique plate 37, and then flows to the liquid collection tank

40. The discharge end of the filter screen oblique plate 37 warps up to form a liquid collection trench; the liquid collection trench blocks the liquid, and prevents the liquid having not passed through the filter screen oblique plate 37 from flowing into the waste bag.

In the liquid collection tank 40, the densities of oil and water are different: oil (about 0.9 g/cm$^3$) is light; water (1.0 g/cm$^3$) is heavy; and the density of the suspension 44 (0.92-0.98 g/cm$^3$, 0.95 g/cm$^3$ in at least one embodiment) is between the oil density and the water density; therefore, the suspension 44 suspends between the upper layer oil and the lower layer water. When the water level reaches a preset water drain level, the suspension 44 links the first water drain valve 42 to open via the linkage rod 45, and the water is discharged out; and when the water level is reduced and the suspension 44 moves downward until the water level is lower than the preset water drain level, the first water drain valve 42 is closed, and the discharge of water is completed. The preset water drain level can be improved/reduced by adjusting the length of the telescopic rod 49. The present embodiment utilizes the density difference between oil and water to configure the suspension 44, utilizes the movement of the suspension 44 to discharge water in a linkage manner, so as to realize the oil and the water being discharged in different channels; the present embodiment has a prominent separation effect and a stable and reliable control performance, can effectively collect oil, and can prevent the increase of sewage treatment load; the height difference between the suspension and the first water drain valve 42 can be adjusted by adjusting the length of the telescopic rod 49 on the linkage rod 45, so as to set/adjust the water drain level.

When the oil level reaches the height of the oil drain pipe 43, the oil overflows and is automatically discharged out.

The process realize the oil-water separation and discharge, and can recycle the oil by means of collection.

Embodiment 5

The apparatus provided by the present embodiment has a cleaning function compared to the embodiment 4, and further optimize the oil-water separation, discharge and collection effects.

Figure 5:
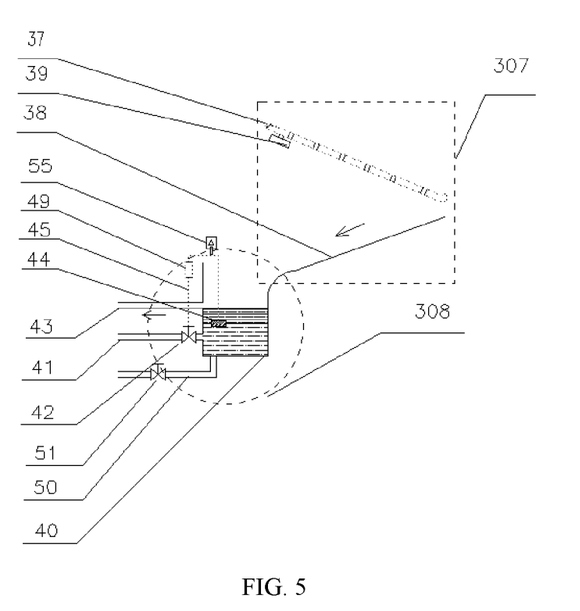
FIG. 5 is a structural schematic view of a filtration device and an oil-water separation device according to the embodiment 4 and the embodiment 5.

On the basis of the structure of the embodiment 4, with reference to FIG. 4-5, a second water drain pipe 50 is disposed at the bottom of the liquid collection tank 40; a second water drain valve 51 is disposed on the second water drain pipe 50; the second water drain valve 51 and the first water drain valve 42 are connected to the central controller 22.

A spray head 11 is respectively disposed above the squeezing device 04, the crushing device 07, and the filtration device 307; the spray heads 11 are connected to a water inlet pipe 53; a water inlet valve 54 is disposed on the water inlet pipe 53; and the water inlet valve 54 is connected to the central controller 22. In some embodiments, the spray head 11 is a rotating spray head.

A sensor 52 is disposed on the crushing device 07; in the present embodiment, the sensor is disposed on a rear face of the support plate 36, and is a vibrating sensor; the sensor 52 is connected to the central controller 22; after the crushing device 07 stops operating, the sensor 52 transmits a start signal to the central controller 22. The central controller 22 starts timing after receiving the start signal, and opens the water inlet valve 54 after a 0.5-5 min delay. In at least one embodiment, the water inlet valve 54 is opened after a 1 min delay.

In some embodiments, the central controller 22 controls the water inlet valve 54 to open for at least 1-10 min. In at least one embodiment, the water inlet valve 54 is opened for at least 2 min.

Furthermore, a monitoring camera 55 is disposed above the linkage rod 45; the monitoring camera 55 is disposed at a position that an upper end of the linkage rod 45 can exactly touch when the suspension 44 and the oil drain pipe 43 are at the same height; and the monitoring camera 55 is connected to the central controller 22.

After the water inlet valve 54 is opened, the central controller 22 controls the first water drain valve 42 to close; if the central controller 22 does not receive a signal indicating that the monitoring camera 55 is touched by the linkage rod, the water inlet valve 54 remains open; if the controller 22 receives the signal indicating that the monitoring camera 55 is touched by the linkage rod, the water inlet valve 54 is closed (under the premise that the time has passed 2 min), and the second water drain valve 51 is opened. After the water inlet valve 54 is closed, the second water drain valve 51 is closed after a 5-30 s delay. In at least one embodiment, the second water drain valve 51 is closed after a 10 s delay.

The operating process of the present embodiment is:

After the crushing is completed, the sensor 52 transmits a start signal to the central controller 22. The central controller 22 receives the start signal, and opens the water inlet valve 54 after a 1 min delay; after the water inlet valve 54 is opened, the spray heads 11 spray water to rinse the squeezing device 04, the crushing device 07, and the filtration device 307, thereby reducing the residue liquid which may emit peculiar smell, and ensuring the interior of the system to be clean and sanitary.

The central controller 22 controls the water inlet valve 54 to open for at least 2 min, that is, cleaning is performed for at least 2 min. Under the action of water pressure, the spray heads 11 perform rinsing while rotating, thereby realizing no-dead-angle rinsing. The central controller 22 realizes delay control; the spray heads 11 spray water to rinse the squeezing device 04, the crushing device 07, and the filtration device 307, thereby reducing the residue liquid which may emit a great deal of peculiar smell, and ensuring the members of the apparatus to be clean so as to prevent pathogenic bacteria from breeding; furthermore, the components are cleaned after a delay after the waste are crushed and filtered, thereby having no interference on the treatment process such as waste squeezing, water extruding, cutting, crushing and the like.

In the process that the water inlet valve 54 is opened and the spray heads 11 perform cleaning, the central controller 22 controls the first water drain valve 42 on the first water drain pipe 41 to close, and utilizes the rinsing water to enable the oil in the liquid collection tank 40 to float and overflow. After the oil in the liquid collection tank 40 is discharged completely, the suspension 44 suspends at the same height as the oil drain pipe 43, and the linkage rod 45 comes into contact with the monitoring camera 55. If the central controller 22 receives the signal of the monitoring camera 55, the water inlet valve 54 is closed to stop the operation of the spray heads 11 (under the premise that the time has passed 2 min). In the present embodiment, in the rinsing process of the cleaning spray heads, the first water drain valve 42 is closed; the rinsing water is utilized to enable the oil in the liquid collection tank to float and overflow; the suspension monitors to ensure the oil is discharged completely; therefore, the present disclosure can effectively collect oil, and solves the blockage problem caused if the oil staying in the system may solidify in a low temperature environment. The temperature of the rinsing water of the water inlet valve 54 can be set according to specific environments.

Furthermore, if the central controller 22 receives the signal indicating that the monitoring camera 55 is touched by the linkage rod, then the second water drain valve 51 is opened; after the water inlet valve 54 is closed, the second water drain valve 51 is closed after a 10 s delay, thereby enabling waste liquid in the liquid collection tank 40 to be discharged completely, and ensuring the interior of the system to be clean and sanitary. The present embodiment can also be used as an apparatus for rinsing and cleaning the waste collection apparatus.

Embodiment 6

The present embodiment provides an organic waste collection method.

The method can be applied to the collection apparatus of the embodiment 5, and includes the following steps:

the waste bag 5 containing waste is hung on the conveying device 02, and is conveyed to the separation device 03 by the conveying device;

when the waste bag 5 is conveyed to the separation device 03, the waste bag 5 comes into contact with the cutter and is cut; the waste therein are released and fall into he crushing device 07; and the waste bag 5 enters the squeezing device 04, so as to separate the waste from the waste bag 5;

the crushing device 07 crushes and pulps the waste; the treated waste fall on the filter screen oblique plate 37 of the filtration device to perform solid-liquid separation, wherein the liquid enters the oil-water separation device 308 to perform oil-water separation and oil recovery, and the solid enters the waste bag laid by the bag layer 46, and is then packed and transported;

the squeezing device 04 extrudes out the water in the waste bag 5; the treated waste bag 5 shrinks by heat and bonds into a lump via the heat shrink device 05, is then collected in the recycling device 06, and finally taken out from the bag taking opening 21;

the spray heads 11 spray water to clean the squeezing device 04, the crushing device 07, and the filtration device 307, so as to remain the components clean.

The operations of the conveying device 02, the heat shrink device 05, the residue treatment device 08, and the oil-water separation device 308 are all controlled by the central control device 22.

It should be noted that: the descriptions above are only preferred embodiments of the present disclosure, but are not intended to limit the present disclosure;

although the present disclosure is described in detail with reference to the above embodiments, a person skilled in the art can still modify the technical solutions set forth in the above embodiments, or make equivalent substitutions to some of the technical features therein; and any modifications, equivalent substitutions, improvements and the like within the spirit and principles of the present disclosure are all intended to be concluded in the protection scope of the present disclosure.

What is claimed is:

1. An organic waste collection apparatus, comprising a box, wherein the box contains:

a conveying device, a separation device, a squeezing device, a heat shrink device and a recycling device, wherein the conveying device, the separation device, the squeezing device, the heat shrink device and the recycling device are arranged at an upper part of the box for separating a waste bag;

a crushing device and a residue treatment device, wherein the crushing device and the residue treatment device are arranged at a lower part of the box for crushing and collecting organic waste;

a central control device and a negative pressure purification device, wherein the central control device and the negative pressure purification device are arranged in a middle of the box;

wherein the conveying device is disposed on an inlet side of the box, the separation device is disposed below the conveying device or at an end of the conveying device, the separation device and the heat shrink device are respectively disposed on two sides of the squeezing device;

the recycling device is disposed on an outlet side of the box;

the crushing device is arranged below the separation device and above the residue treatment device;

wherein, the conveying device comprises a horizontal track and a moving base for reciprocating on the horizontal track; a bag rolling motor is installed on the moving base; a primary rod for hanging the waste bag is fixedly installed on a rotating shaft of the bag rolling motor; a hammer and an auxiliary rod are fixed on the primary rod; the auxiliary rod is fixed on a side adjacent to the squeezing device, and the auxiliary rod comprises a fixed section and a bending section; a bending spring is disposed between the fixed section and the bending section; the bending section is in parallel with the primary rod; the conveying device is fixedly provided with a baffle plate on the side adjacent to the squeezing device; the primary rod is configured so that when the primary rod moves to a leftmost end of the horizontal track, the bending section of the auxiliary rod bends under a blocking of the baffle plate.

2. The organic waste collection apparatus according to claim 1, wherein, the separation device is a first cutter disposed below the conveying device; the waste bag is configured so that when the waste bag containing the organic waste is conveyed to the first cutter, a lower part of the waste bag comes into contact with the first cutter and is cut by the first cutter, and the organic waste inside the waste bag fall into the crushing device.

3. The organic waste collection apparatus according to claim 2, wherein, the squeezing device comprises squeezing rollers, wherein the squeezing rollers are pairwise configured, the squeezing rollers are configured to elastically press each other, and the squeezing rollers have smooth surfaces; piercing rollers are pairwise configured, elastically press each other, and have spikes, and the piercing rollers are disposed at a front end of the squeezing device; the squeezing device is configured so that when a separated waste bag is conveyed to the squeezing device, the waste bag is driven by the primary rod to pass through the piercing rollers and the squeezing rollers; and a spray device is disposed above the squeezing device.

4. The organic waste collection apparatus according to claim 3, wherein, the heat shrink device is a first heater arranged at a rear end of the squeezing device; the heat shrink device is configured so that when the waste bag is conveyed to the heat shrink device after organic waste is squeezed out, the first heater and the bag rolling motor simultaneously operate, enabling the waste bag to shrink and roll on the primary rod and the auxiliary rod; a rotating push rod for stripping the waste bag rolled on the primary rod and the auxiliary rod is disposed at a rightmost end of the horizontal track; the rotating push rod is disposed above the recycling device; and the recycling device is a first bag box.

5. The organic waste collection apparatus according to claim 1, wherein, the conveying device is a conveyor belt; the separation device is disposed at an end of the conveyor belt, and the separation device is a second cutter; the waste bag is configured so that when the waste bag containing the organic waste is conveyed to the second cutter, a side end of the waste bag comes into contact with the second cutter and is cut by the second cutter, and the organic waste inside the waste bag falls into the crushing device.

6. The organic waste collection apparatus according to claim 5, wherein, the squeezing device comprises two sets of squeezing belt groups, each of the two sets of squeezing belt groups comprises two belts, wherein the two belts are configured to rotate from outside to inside and elastically press each other; the two belts are each vertically oriented; and the second cutter is disposed within the squeezing device comprised of two sets of squeezing belt groups; a suction bucket is disposed at a rear end of the squeezing device, and a feed opening is disposed below the suction bucket.

7. The organic waste collection apparatus according to claim 6, wherein, the heat shrink device is a second heater, and the second heater is installed on a side wall of the feed opening; the recycling device is a second bag box; and a suction pump is disposed above the second bag box.

8. The organic waste collection apparatus according to claim 4, wherein, the crushing device comprises crushing rollers, and the crushing rollers are pairwise configured, a support plate for supporting the crushing rollers, and an elastic mechanism, gear teeth of the crushing rollers alternately fit with each other;
the negative pressure purification device comprises a negative pressure pump, an ultraviolet sterilization chamber and an adsorption and treatment chamber, the ultraviolet sterilization chamber and the adsorption and treatment chamber are sequentially connected to an inlet of the negative pressure pump, an outlet of the negative pressure pump is in communication with an ambient environment.

9. The organic waste collection apparatus according to claim 8, wherein, the residue treatment device comprises a residue bucket and a rotating cover disposed at an upper end of the residue bucket; the residue treatment device is further provided with a transportation device, the transportation device is in communication with the residue bucket via a suction pipe, and the transportation device is provided with a liquid pump.

10. The organic waste collection apparatus according to claim 8, wherein, the residue treatment device comprises a filtration device and an oil-water separation device, the filtration device comprises a filter screen oblique plate and a water receiving and flow guiding plate arranged below the crushing rollers; the filter screen oblique plate is connected to a vibrator, and the filter screen oblique plate is provided with soft baffle plates on two sides; the soft baffle plates are in close contact with inner walls of the organic waste collection apparatus;
the water receiving and flow guiding plate is installed below the filter screen oblique plate;
the oil-water separation device comprises a liquid collection tank, an oil drain pipe, and a first water drain pipe; and the water receiving and flow guiding plate is in communication with the liquid collection tank;
the oil drain pipe and the first water drain pipe are disposed on one side of the liquid collection tank, and the oil drain pipe is higher than the first water drain pipe; a first water drain valve is disposed on the first water drain pipe; a suspension with a density in a range of 0.92-0.98 g/cm$^3$ is disposed in the liquid collection tank; and the suspension is linked with the first water drain valve via a linkage rod;
a bag layer is installed below a discharge end of the filter screen oblique plate; the bag layer is connected to a waste bag roll; and a tying device is disposed below the bag layer.

11. The organic waste collection apparatus according to claim 10, wherein, a telescopic rod is disposed on the linkage rod, and the telescopic rod is configured for setting/adjusting a water drain level of the first water drain pipe of the liquid collection tank.

12. The organic waste collection apparatus according to claim 11, wherein, a second water drain pipe is disposed at a bottom of the liquid collection tank; a second water drain valve is disposed on the second water drain pipe; the first water drain valve and the second water drain valve are connected to the central control device.

13. The organic waste collection apparatus according to claim 12, wherein, a sensor is disposed on the crushing device, the sensor is connected to the central control device; the sensor is configured so that after a crushing is completed, the sensor transmits a start signal to the central control device.

14. The organic waste collection apparatus according to claim 13, wherein, a spray device is respectively disposed above the crushing rollers and the filter screen oblique plate; the spray device comprises spray heads, the spray heads are in communication with a water inlet pipe; a water inlet valve is disposed on the water inlet pipe, and the water inlet valve is connected to the central control device.

15. The organic waste collection apparatus according to claim 14, wherein, the central control device is configured to start a timing after receiving the start signal, and the central control device is configured to open the water inlet valve after a 0.5-5 min delay; and the central control device is configured to control the water inlet valve to open for at least 1-10 min.

16. The organic waste collection apparatus according to claim 15, wherein, a monitoring camera is disposed above the linkage rod; the monitoring camera is disposed at a position, wherein an upper end of the linkage rod touches the position when the suspension and the oil drain pipe are at a same height; and the monitoring camera is connected to the central control device.

17. The organic waste collection apparatus according to claim 16, wherein, after the water inlet valve is opened, the central control device is configured to control the first water drain valve to close; the central control device is configured so that when the central control device does not receive a signal indicating that the monitoring camera is touched by the linkage rod, the water inlet valve remains open; the central control device is configured so that when the central control device receives the signal indicating that the monitoring camera is touched by the linkage rod, the water inlet valve is closed, and the second water drain valve is opened; and after the water inlet valve is closed, the second water drain valve is closed after a 5-30 s delay.

18. An organic waste collection method, wherein the organic waste collection method is applied to the organic waste collection apparatus of claim 1, and the organic waste collection method comprises:

placing the waste bag containing the organic waste on the conveying device, and conveying the waste bag to the separation device;

cutting the waste bag, the organic waste falling into the crushing device, and the waste bag entering the squeezing device to separate the organic waste from the waste bag;

the squeezing device squeezing out organic waste in the waste bag to obtain a treated waste bag; the treated waste bag shrinking bonding into a lump by the heat shrink device, then collecting the treated waste bag in the recycling device;

the crushing device crushing and pulping the organic waste to obtain treated waste; the treated waste falling into the residue treatment device;

operations of the conveying device, the heat shrink device, the residue treatment device are all controlled by the central control device.

19. The organic waste collection method according to claim 18, wherein the organic waste collection method further comprises:

the residue treatment device collecting a residue and then a transportation device transporting the residue;

or after the residue treatment device collecting the residue, a filtration device filtering the residue to achieve a solid-liquid separation, then an oil-water separation device recovering an oil.

\* \* \* \* \*